Feb. 4, 1930.  T. HORIKOSHI  1,745,834
AUTOMATICALLY RELEASABLE SPRING ACTUATED FISHHOOK
Filed June 1, 1926

INVENTOR.
TOKUJIRO HORIKOSHI.
BY
ATTORNEYS.

Patented Feb. 4, 1930

1,745,834

UNITED STATES PATENT OFFICE

TOKUJIRO HORIKOSHI, OF LOS ANGELES, CALIFORNIA

AUTOMATICALLY-RELEASABLE SPRING-ACTUATED FISHHOOK

Application filed June 1, 1926. Serial No. 112,838.

This invention relates to a fish hook apparatus having a longitudinally movable staff or bar with a fish hook rigidly secured at one end thereof which is adapted to be retracted longitudinally into a tubular member carried by a support parallel with said staff, and a spring connecting said staff and support for projecting the hook and the staff outward when released by interference with bait holding means on said tube, and the line may be connected with either the fish hook staff or said support associated therewith.

Figure 1:
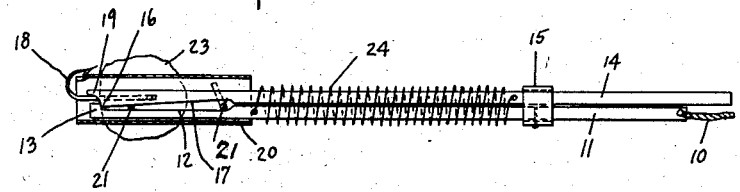
Figure 2:
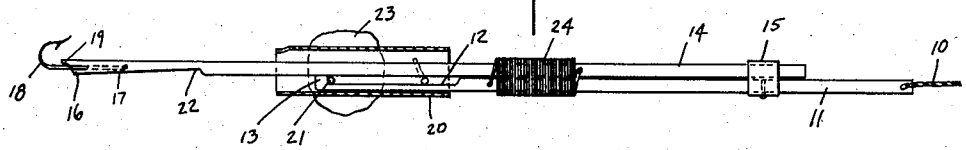
Figure 3:
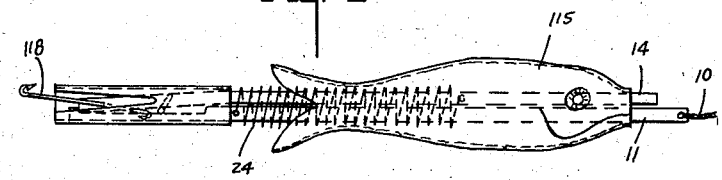
Figure 4:
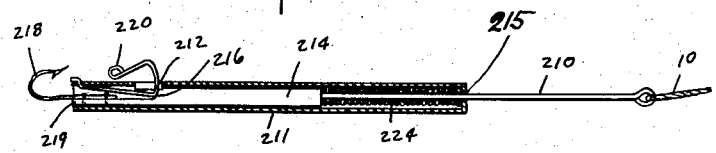
Figure 5:
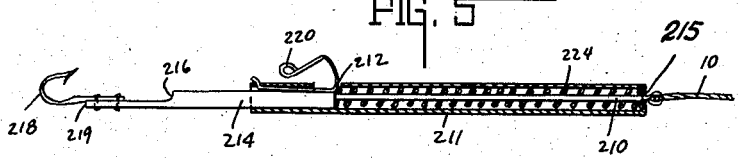

The full nature of the invention will be understood from the accompanying drawings and the following description and claims:

In the drawings Fig. 1 is a longitudinal sectional view of the automatic fish hook in the set position. Fig. 2 is a similar view of the same parts in the discharged or impaling and retaining position. Fig. 3 is a view similar to Fig. 1 of a modified form of the invention. Fig. 4 is a central sectional view of a still further modified form of the invention showing the same parts in the set position. Fig. 5 is a view similar to Fig. 4 and of the same modification but showing the same in the impaling or retaining position.

In the drawings 10 indicates a suitable lead or supporting line and in Figs. 1 and 2 the same is secured to one end of the bar or support member 11 which is shown provided with a cut-out or elongated recess 12 near the opposite end terminating in an inclined shoulder 13 constituting a catch or retainer.
Positioned adjacent thereto and longitudinally slidable with respect to the support 11, is the staff 14. Suitable guide means 15 carried by the support retains one end of the staff in position adjacent said support. The opposite end of the staff is provided with an inclined abutment 16 and a cam surface 17 extending from abutment 16 to an inclined shoulder 22. The same end of the staff supports a suitable retainer in the form of a hook 18, or the like, and the forward portion of said staff 14 at 19 may be sharpened for penetration if desired, or also may be barbed. Supported by the support member 11 is an enveloping tube or sleeve 20 which carries bait and includes two transverse pins 21 that extend from side to side thereof and are positioned in the space between the cam surface 17 on hook staff 14 and the recess 12 in support member 11 when the parts are in the set position. The tubular member 20 is carried by bar 11 and is adapted to hold suitable bait 23. A coil spring or other yielding means 24 connects the support 11 and staff 14 in such a manner that said staff is normally movable longitudinally from the position shown in Fig. 1 to the position shown in Fig. 2 when the two members are disassociated from the set position by means of the pin 21 moving forwardly in the recess 12 and engaging the cam surface 17 to release the inclined abutment 16 from the inclined shoulder 13. The member 21 may, if desired, be so fashioned that it protrudes laterally or otherwise of the tubular bait supporting member and the bait may be anchored thereto by said lateral portions.

In Fig. 3 a modified form of the invention shows the same parts as hereinbefore specified and in addition there is provided in the form of a guide 115 a fish-like body for deceiving the fish. This may be suitably ornamented as well known in the bait art. In this form of the invention the hook 118 is dissimilar from the hook 18 previously described, and consists of a multiple construction which when projected by reason of the relative movement of the staff 14 and support 11, has imparted to it a twirling or whirling motion. This is certain to engage some portion of the anatomy of the animal or fish taking the bait, particularly the mouth and throat thereof and firmly anchor thereto. As shown in Fig. 3 the tubular member 20 is slotted adjacent one end so that the hook 118 can be retracted within said tubular member, and also this slot makes the inclined shoulder 13 and the inclined abutment visible when they are moved together to facilitate setting the hook with great delicacy so that even a slight nibble on the bait will cause the abutment to slide off the inclined shoulder, thereby releasing staff 14 to snag the fish.

Figs. 4 and 5 illustrate a further departure of the invention, and herein the support is in the form of a tubular member 211 and slidably supported therein is a staff 214 provided with a stem 210 to which is secured the line. The rod 210 passes thru the rear end or closure 215 of the support 211 and the same serves as a guide for the staff and stem. It also serves as a spring retainer for one end of the spring 224, the other end bearing upon the staff 214 adjacent the junction with the stem. The support, while cylindrical, is apertured as at 212 and projecting therethrough is a bait supporting member 220, said bait supporting member being movably mounted upon the support as in the previous forms of the invention. The staff is recessed or cut away as at 216 and forms a stop for retaining said staff in a set position. The staff supports the usual hook mechanism 218 and the end 219 thereof may be suitably formed as desired for penetrating a fish or animal taking the bait from the supporting member 220. When said supporting member releases the staff to the spring the staff will be projected from the position shown in Fig. 4 to the position shown in Fig. 5.

The bar or support member 11 and the tube 20 carried thereby, in Figs. 1, 2 and 3, are a relatively fixed unit for holding the bait and as distinguished from the relatively movable fish hook staff 14. The spring 24 is connected to said two members, the fish hook staff and the bait support, thus broadly considered.

The form shown in Figs. 4 and 5 likewise has two general members, the tubular bait support 211 and the hook staff 214 and 210, and the spring 224 connects them so as to cause projection of the fish hook staff as in Fig. 2. Hence, in both forms there is a tubular bait holding member in which the fish hook end of the staff lies concealed when in retracted position, and is projected therefrom when the fish hook staff is released, and such projection in both forms is caused by interference with the bait holding means associated with said tube, so that the fish will take the tube into his mouth with the bait thereon and then the fish hook staff will be released. So the two forms are substantially the same regardless of which member the line is connected with. The tube or bait holding member, whether a simple tube or compound construction, is relatively stationary and the fish hook staff is movable relatively thereto.

The invention claimed is:

1. A device of the character described including a tubular supporting member, a staff having a hook at one end thereof and longitudinally movable so as to retract the hook within said tubular member so as to conceal the hook, an inclined abutment on said staff adapted to be engaged with an inclined shoulder in said tubular member for delicately holding said staff in a retracted position, a spring acting between said tubular supporting member and staff for projecting the latter longitudinally beyond said member when said staff is released, and a bait holding means associated with said tubular supporting member for causing the release of said staff when the bait is interfered with.

2. A device of the character described including a tubular supporting member slotted from one end for a portion of its length, a staff having a fish-hook at one end thereof and longitudinally movable so as to retract the fish hook within said tubular member at the slotted end thereof so as to conceal said hook, an inclined shoulder in said tubular member, an inclined abutment on said staff adapted to be engaged with said shoulder for delicately holding said staff in a retracted position, a spring acting between said tubular supporting member and staff for projecting the latter longitudinally beyond said member when said staff is released, and a bait holding means associated with said tubular supporting member for causing the release of said staff when the bait is interfered with.

In witness whereof, I have hereunto affixed my signature.

TOKUJIRO HORIKOSHI.